United States Patent [19]

Kanamori

[11] Patent Number: 4,560,597
[45] Date of Patent: Dec. 24, 1985

[54] COLLAPSIBLE ORNAMENT STRUCTURE

[75] Inventor: Hiroshi Kanamori, Yokohama, Japan

[73] Assignee: Nissan Motor Co., Ltd., Yokohama, Japan

[21] Appl. No.: 635,143

[22] Filed: Jul. 27, 1984

[30] Foreign Application Priority Data

Aug. 5, 1983 [JP] Japan .................. 58-144109

[51] Int. Cl.⁴ .................................... B60R 13/04
[52] U.S. Cl. ............................ 428/31; D12/197; 40/591; 280/727
[58] Field of Search .................. 428/31; D12/197; 40/591; 280/727; 411/429

[56] References Cited

U.S. PATENT DOCUMENTS

| | | | |
|---|---|---|---|
| 3,813,113 | 5/1974 | Burnham | 428/31 X |
| 3,968,977 | 7/1976 | Wilfert | 428/31 X |
| 4,349,591 | 9/1982 | Kanamori | 428/31 |
| 4,400,417 | 8/1983 | Kanamori et al. | 428/31 |
| 4,443,832 | 4/1984 | Kanamori et al. | 428/31 X |

FOREIGN PATENT DOCUMENTS 831615 3/1960 United Kingdom ............... 428/31

Primary Examiner—Henry F. Epstein
Attorney, Agent, or Firm—Schwartz, Jeffery, Schwaab, Mack, Blumenthal & Evans

[57] ABSTRACT

A collapsible ornament according to the present invention includes a base fixed to an outer panel of a hood, and an ornament body having a hollow part formed by supporting a decorative laminated sheet and a hollow cylindrical shaft connected to the hollow part to hold the ornament body up. A coil spring is inserted into the hollow cylindrical shaft. The lower end of the spring is supported by a supporting body which is located at the bottom end of the hollow cylindrical shaft. In addition, a shaft member extends into the inside of the spring and its lower end is engaged with a hole formed in the base. An upper end of the shaft is coupled to the upper end of the spring.

8 Claims, 3 Drawing Figures

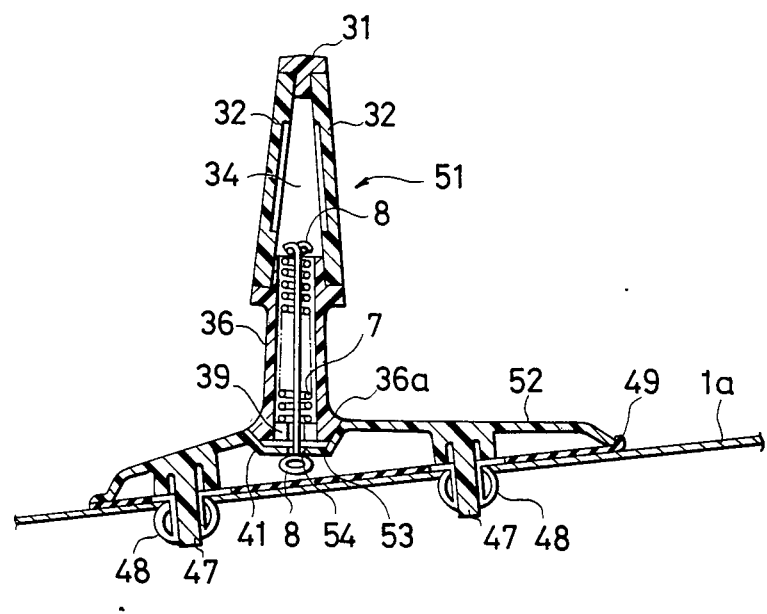

COLLAPSIBLE ORNAMENT STRUCTURE

BACKGROUND OF THE INVENTION

1. Field of the Invention

This invention relates to a mounting structure for a collapsible ornament on an vehicle.

2. Description of the Prior Art

A known type of collapsible ornaments for use on an vehicle includes an ornament body, a base which supports the ornament body in such a manner that it can be collapsed, and a shaft which protrude out downward from the base. Inside this shaft is inserted a coil spring which rockably holds the ornament body in its raised position. The type of collapsible ornament described above was disclosed in Japanese Patent Publication No. 57-182542/1982.

However, in the type of collapsible ornament described above, the shaft which protrude below the base extends through a hole that is formed in a outer panel of the car body. For this reason, there is a possibility that the lower end of the shaft may contact a inner panel of the car body. Consequently, the ornament with the structure described above can only be mounted at a location where the separation between the outer panel and the inner panel of the car body is relatively large, such as a location where a striker is mounted. That is to say, the locations where the ornament can be mounted are limited.

SUMMARY OF THE INVENTION

An object of the present invention is to provide a collapsible ornament which can be mounted at any desired location on a car body.

Another object of the present invention is to provide a collapsible ornament which is capable of narrowing the space between a outer panel and a inner panel of a hood.

A further object of the present invention is to provide a collapsible ornament which is capable of designing the space between a outer panel and a inner panel of a hood at will.

A further object of the present invention is to provide a collapsible ornament which prevent water from entering during car washing, rain, etc.

Briefly described, these and other objects of the present invention are accomplished by the provision of an improved collapsible ornament which includes a base fixed to a outer panel of a hood, and an ornament body having a hollow part formed by supporting a decorative laminated sheet and a hollow cylindrical shaft connected to the hollow part to hold the ornament up. A coil spring is inserted into the hollow cylindrical shaft. The lower end of the spring is supported by a supporting body which is located at the bottom end of the hollow cylindrical shaft. In addition, a shaft member extends into the inside of the spring and its lower end is engaged with a hole formed in the base. An upper end of the shaft is coupled to the upper end of the spring.

BRIEF DESCRIPTION OF THE DRAWINGS

These and other objects, features and advantages of the present invention will be more apparent from the following description of a preferred embodiment, taken in conjunction with the accompanying drawings, in which:

FIG. 3 is a side cross-sectional view of another embodiment of the present invention.

DESCRIPTION OF THE PREFERRED EMBODIMENTS

Figure 1:
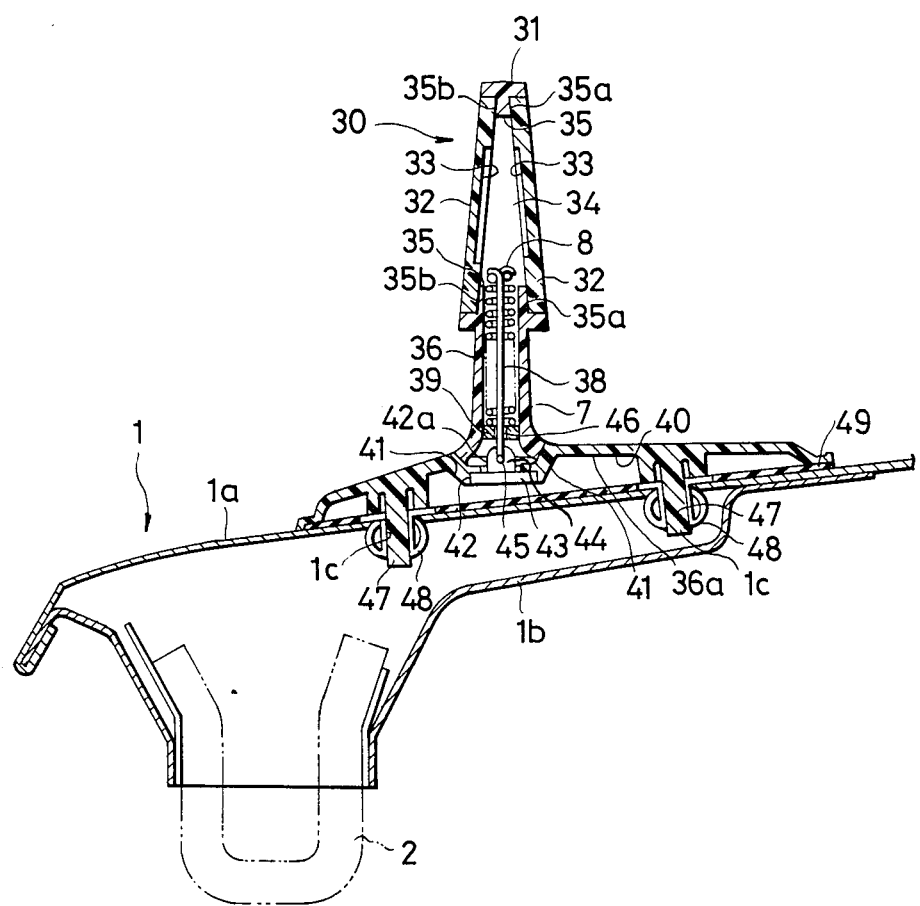
FIG. 1 is a side cross-sectional view of a collapsible ornament embodying the present invention as it is mounted on a car body.
Figure 2:
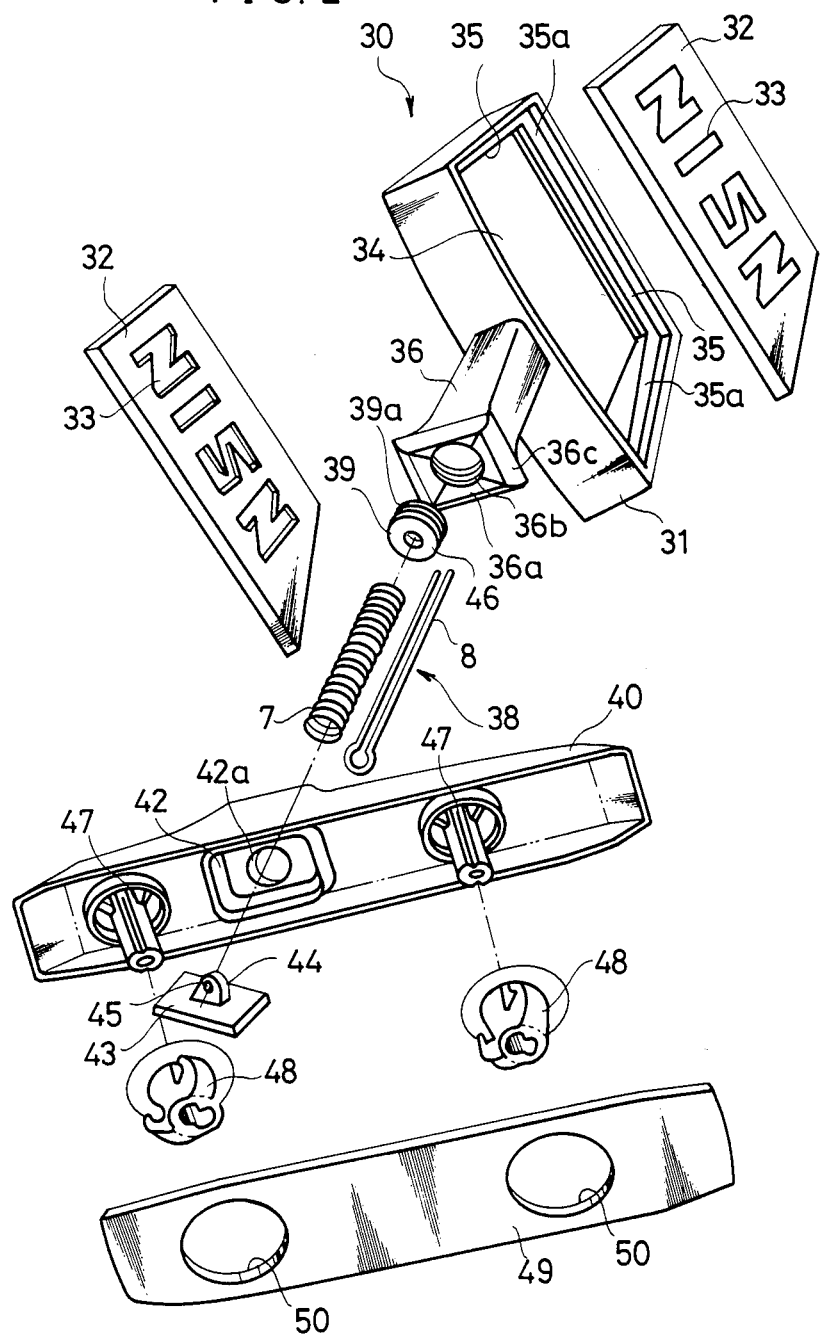
FIG. 2 is a perspective exploded diagram of the collapsible ornament shown in FIG. 1.

Referring now to FIGS. 1 and 2, the collapsible ornament of the present invention is shown by reference numeral 30. The collapsible ornament 30 has a base 40 which is coupled to support holes 1c formed in the outer panel 1a of a car body hood 1 by means of a clip 48. On the base 40, a ornament body 31 is rockably mounted. The ornament body 31 has a hollow part 34 for supporting decorative laminated sheet 32 and a hollow cylindrical shaft 36 connected to the hollow part 34. That is to say, a depression 41 is formed on the top of the base 40 so that the surface 36c of the bottom end 36a of the hollow cylindrical shaft 36 is free to slide against the depression 41. A coil spring 7 is inserted into the hollow cylindrical shaft 36. The lower end of the spring 7 is in contact with a supporting body 39 which is screwed to the female screw 36b formed at a bottom end of the hollow cylindrical shaft 36. A hole 42a is formed in the depression 41 of the base 40, and below the hole 42a there is a receptacle 42. The retainer 43 having a boss 44 with a hole 45 is inserted into the receptacle 42. The boss 44 passes through the hole 42a and protrude above the hole 42a.

A shaft 38 such as a split pin extends into the spring 7. The lower end of the split pin 8 passes through a hole 45 in the boss 44 and is fixed in place. The middle part of a pin 8 passes through the hole 46 in the supporting body 39 and extends upward through the middle of the spring 7. The upper end of the pin 8 is bent and is coupled to the upper end of the spring 7. Consequently, the retainer 43 is pressed against the receptacle 42 of the base 40 by the force of the spring 7.

In an ornament as described above, if an external force is applied to the ornament body 31, the surface 36c of the hollow cylindrical shaft 36 slides against the depression 41 in the base 40. Consequently, with the lower end 36a of the hollow cylindrical shaft 36 as a support point, the ornament body 31 rocks while compressing the spring 7 through the pin 8. Then, when the external force is removed, the ornament body 31 is restored to predetermined position, namely, its previous raised position by the force of the spring 7. In the action described above, even if the upper ends of the split pin 8 and the spring 7 move up, down, right or left, because of the presence of the hollow part 34, the decorative laminated sheet 32 is not affected.

In addition, the clips 48 of the base 40, which are aligned in the forward-rear direction, are fastened to bosses which protrude just slightly downward from the outer panel 1a. In between the base 40 and the outer panel 1a, a piece of soft material 49 such as rubber is inserted.

The decorative laminated sheets 32 adhere to the front and rear surfaces 35a and 35b of a protrusion 35 which is formed around the hollow interior 34 of the above-mentioned ornament body 31. Marks, letters, etc. which are inscribed on the inside surfaces of these decorative laminated sheets 32 and 32 are concealed on the inside.

Consequently, in the collapsible ornament as described above, since structures such as the spring 7, the pin 8, etc. are inside the ornament body 31 above the outer panel 1a, the ornament can be mounted even where the spacing between the outer panel 1a and the inner panel 1b is narrow.

Next, there is explained the procedure for assembling a collapsible ornament such as the one described above.

In FIGS. 1 and 2, the male screw 39a of the supporting body 39 is screwed into the female screw 36b on the bottom end 36a of the hollow cylindrical shaft 36 of the ornament body 31. The spring 7 is inserted inside the hollow cylindrical shaft 36 from above. Next, the split pin 8 is inserted into the hole 45 in the boss 44 of the retainer 43, and the retainer 43 is coupled to the receptacle 42 of the base 40. The split pin 8 is inserted inside the spring 7 through the hole 46 of the supporting body 39. The upper end of the pin 8 is bent in such a way as to hook the upper end of the spring 7. Therefore the upper end of the pin 8 and the upper end of the spring 7 are fastened together.

Next, the decorative laminated sheets 32 are fixed to the front and rear surfaces 35a and 35b of the protrusion 35 of the ornament body 31. Finally the clips 48 which are snap-fitted onto the bosses 47 of the base 40 are snapped into the holes 1c in the outer panel 1a.

Another embodiment of a collapsible ornament embodying the present invention is shown in FIG. 3. In this embodiment, the retainer 43 used in the previous embodiment is not used; instead, a bottom is formed in the depression 41 of the base 52, and the split pin 8 is inserted directly into the hole 54 in the bottom 53.

In summary, since there are a spring and a pin inside the ornament body, it is possible for the ornament to be knocked over and rebound to its original position. In addition, only the bosses protrude below the base, so that the spacing between the outer panel and the inner panel of the hood can be designed freely. Consequently, a great deal of freedom is preserved in the choice of location where the ornament is to be mounted. In addition, since the pin and the spring are inside the ornament body, the ornament can be made water tight during car washing, rain, etc., and these parts will not rust. In addition, since the spacing between the outer panel and the inner panel of the hood can be made narrow, the height of the hood can be made lower, resulting in improving the aerodynamic characteristics of the car.

Various modifications will become possible for those skilled in the art after receiving the teachings of the present disclosure without departing from the scope thereof.

What is claimed is:

1. A collapsible ornament on a hood comprising:
   a base which is fixed to an outer panel of the hood;
   an ornament body which is rockably mounted on said base, said ornament body including a part for supporting a decorative laminated sheet, and a hollow cylindrical shaft one end of which is connected to the supporting part and the other end of which is in contact with said base;
   collapsible means for rockably holding said ornament body in a predetermined position, said collapsible means being provided inside the hollow cylindrical shaft of said ornament body and located totally outside the outer panel, after the base with the ornament body including the collapsible means are fixed to the outer panel.

2. A collapsible ornament as claimed in claim 1, in which said collapsible means comprises a pin member which is inserted into the hollow cylindrical shaft to have a lower end connected to said base and a spring which is inserted into the hollow cylindrical shaft to have upper end coupled to an upper end of the pin member and an lower end connected to the hollow cylindrical shaft of said ornament body.

3. A collapsible ornament as claimed in claim 2, in which said collapsible means further comprises a supporting body which is screwed to the female screw formed at a bottom end of the hollow cylindrical shaft for supporting the lower end of the spring, the supporting body having a hole through which the pin member extends upward through the spring.

4. A collapsible ornament as claimed in claim 1, in which the supporting part is a hollow part which is formed by supporting the decorative laminated sheet.

5. A collapsible ornament as claimed in claim 3, in which a depression is formed on a top of said base so that a surface of the bottom end of the hollow cylindrical shaft is free to slide against the depression.

6. A collapsible ornament as claimed in claim 5, in which said collapsible means further comprises a hole formed in the depression of said base, a receptacle provided below the hole, and a retainer which has a boss with a hole and is inserted into the receptacle, the boss of the retainer passing through the hole and protruding above the hole, the lower end of the pin member passing through the hole of the boss of the retainer.

7. A collapsible ornament as claimed in claim 6, in which the pin member is a split pin.

8. A collapsible ornament as claimed in claim 1, in which said base is coupled to a support hole formed in the outer panel of the hood by means of a clip.

* * * * *